United States Patent [19]
Carpenter

[11] 4,161,123
[45] Jul. 17, 1979

[54] PRESSURE GAUGE CONSTRUCTION

[75] Inventor: David M. Carpenter, Berea, Ky.

[73] Assignee: Dresser Industries, Inc., Dallas, Tex.

[21] Appl. No.: 936,972

[22] Filed: Aug. 25, 1978

[51] Int. Cl.² ............................................. G01L 7/04
[52] U.S. Cl. .................................................... 73/741
[58] Field of Search ........................ 73/741, 732–740, 73/742, 743; 72/254

[56] References Cited
U.S. PATENT DOCUMENTS
3,757,582  9/1973  Sellmaier .............................. 73/741

Primary Examiner—Donald O. Woodiel
Attorney, Agent, or Firm—Daniel Rubin

[57] ABSTRACT

The Bourdon tube socket of a pressure gauge is constructed of an extruded metal bar having a first as-extruded slot in which to secure the inlet fixed end of a Bourdon tube. The bar also includes a pair of second as-extruded parallel slots for receipt of case mounting, self-tapping screws and formed of spaced apart arcuate ears extending transversely along each side face thereof.

10 Claims, 4 Drawing Figures

PRESSURE GAUGE CONSTRUCTION

TECHNICAL FIELD

The field of art to which the invention pertains includes the art of measuring and testing and in particular to construction of pressure gauges.

BACKGROUND OF THE INVENTION

Pressure gauges enjoy very extensive commercial and industrial use and are consequently regarded as high production items. Because of their wide use, gauges are available from a plurality of manufacturers and sold in very price conscious competition. Each manufacturer instinctively strives to reduce product costs by improvements, however marginal, which reduce labor and/or materials that can contribute to cost savings in the end product. A typical pressure gauge includes a metal socket of sorts extending outward of the casing where its stem is usually threaded for mounting into position in a fluid system of which pressure is to be measured. A slot formed in one side of the socket communicates with a passage extending inward through the threaded stem and is adapted to receive the inlet of a Bourdon tube for permanent mounting thereat. Such sockets have typically been formed of bar stock or the like in which the Bourdon tube slot is subsequently machined. Also commonly machined subsequently therein are a pair of drilled and tapped apertures extending inward from the rear face of the socket to enable securing the gauge case to the socket by means of fastener screws. It can be readily appreciated that forming the mentioned socket slot and apertures in this manner has required at least five machining operations, i.e., one for slotting the Bourdon tube slot and two each for drilling and tapping each screw mounting aperture. Needless to say, each of these machining steps involves the use of jigs, fixtures, setup time, machining, etc. as to represent an investment affecting the end cost of the gauge. Yet despite recognition of the problem, a ready solution for eliminating or reducing these machining costs has not heretofore been known.

SUMMARY OF THE INVENTION

The invention relates to pressure gauges. More specifically, the invention relates to a novel cost reduction construction for pressure gauges by significantly reducing the machining and attendant costs associated with manufacturing the socket component for such gauges.

The foregoing is achieved in accordance herewith by initially forming the socket block of an extruded metal such as aluminum, brass or the like. The slots for both the Bourdon tube and fastener screws result directly from the as-extruded form of the socket block. Further machining of these slot elements become unnecessary and is therefore eliminated. The Bourdon tube slot is positioned and shaped substantially as in the prior art while the screw slots extend transversely along the side faces of the block for receipt of self-tapping screws in their open ends. Defining each screw slot is a pair of arcuate ears spaced by a transverse gap at their distal ends and inwardly defining a near circular opening in which the fastener screws can be received. Since the machining steps previously associated with the formation of these slots has been eliminated, the attendant costs have likewise been eliminated, resulting in a significant cost saving to the gauge manufacturer.

It is therefore an object of the invention to provide a novel cost saving construction for a pressure gauge.

It is a further object of the invention to effect the cost saving of the previous object by forming and using as-extruded slots in an as-extruded socket of a pressure gauge.

BRIEF DESCRIPTION OF THE DRAWINGS

Referring now to FIGS. 1 and 2 of the drawings, a typical prior art pressure gauge comprises a socket 10 having a threaded stem 12 for system mounting. Fluid pressure represented by arrow 14 is received via passages 42 and 44 (FIG. 4) for communicating with slot 15 in which the inlet of Bourdon tube 16 is connected. The Bourdon tube responds to changes of pressure in a well known manner. Through a linkage and movement (not shown) displacement of the Bourdon tube is translated into movement of a pointer 20 relative to a dial face 22 having graduations of pressure values 24. Generally enclosing the operative components is a more or less cup-shaped case 26 that is commonly attached to socket 10 via a pair of fastener screws 28 received in tapped apertures 30.

Referring more specifically to FIGS. 3 and 4, socket 10 in accordance herewith is illustrated in its as-extruded and post-machined states, respectively. As seen in FIG. 3, socket 10 comprises an elongated bar of rectangular cross-section as-extruded of aluminum, brass or the like. Formed as-extruded are Bourdon tube slot 15 and elongated slots 34 of near full circle transversely extending along each side face of the bar for receipt of self-tapping case mounting screws 28. Defining each slot 34 in this formation are a pair of more or less arcuate ears 36 and 38 that approach each other at their distal ends to form a transverse gap 40 therebetween. Each gap 40 in turn inwardly opens from the side face into an enlarged near circular formation constituting slot 34. Further machining on any of slots 15 or 34 is unnecessary, and there remains to be machined only other features common to the prior art construction, namely, stem threads 12, drilling for primary passage 42 and connecting passage 44 and properly securing of Bourdon tube 16 in socket 15 as by brazing. Slots 15 and 34 therefore are each formed and usable on the end product without the benefit of any machining operating as to eliminate the jigs, fixtures, setup time, machine time, etc. normally associated with the formation of those features. Slot 34 is, of course, sized to accommodate the self-tapping screws to be employed whereby case 26 can be simply and easily mounted thereto in a manner every bit as convenient as previously enjoyed in the prior art.

Figures 1, 2:
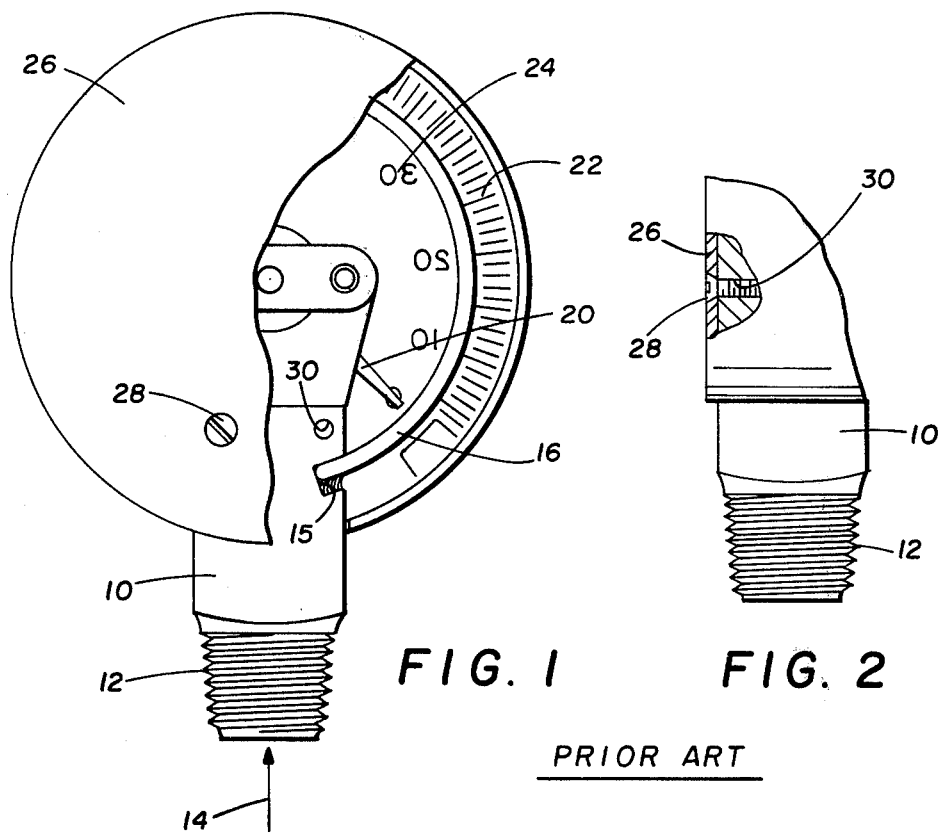
FIG. 1 is a rear elevation partially broken away of a pressure gauge construction in accordance with the prior art.
FIG. 2 is a fragmentary side view of the case mounting structure in FIG. 1.
Figures 3, 4:
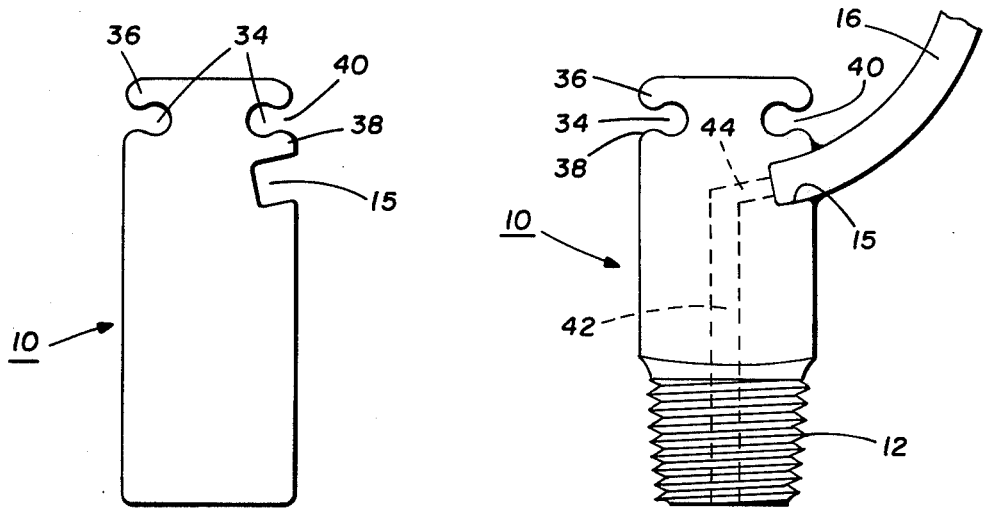
FIG. 3 is a rear elevation of an as-extruded and pre-machined socket in accordance herewith.
FIG. 4 is an elevation view of the post-machined socket of FIG. 3.

By the above description there is disclosed a novel socket construction for a pressure gauge affording a significant cost reduction in the manufacture thereof. By means of a simple yet effective extrusion, substantial savings on the order of greater than ten percent can be realized in the manufacturing cost of the socket enabling the gauge utilizing such socket to be increasingly competitive in the markets in which it is sold.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A socket for a pressure gauge comprising an extruded metal formation including a first as-extruded slot in which to receive the open inlet end of a Bourdon tube and at least one second as-extruded slot for receipt of a self-tapping screw by which a casing can be secured to the socket.

2. A socket according to claim 1 in which said second as-extruded slot extends in a direction substantially transverse to the direction of the primary inlet passage for communicating fluid pressure to said first as-extruded slot.

3. A socket according to claim 2 in which said second as-extruded slot is defined by a pair of arcuate ears extending integrally from a side face of the socket and approaching each other at their distal ends to define a continuous gap therebetween.

4. A socket according to claim 3 in which said metal formation comprises extruded brass.

5. A socket according to claim 3 in which said metal formation comprises extruded aluminum.

6. In a pressure gauge comprising a dial plate having pressure graduations thereon, a pointer, a Bourdon tube operatively sensitive to pressure changes for effecting correlative displacement of said pointer about the graduations on said dial plate, an outer enclosure casing and a socket extending through said casing for communicating fluid pressure to be measured from a source to the inlet of said Bourdon tube, the improvement in which said socket comprises an extruded metal formation including a first as-extruded slot in which to receive the open inlet end of said Bourdon tube and at least one second as-extruded slot for receipt of a self-tapping screw by which said casing can be secured to said socket.

7. The improvement according to claim 6 in which said second as-extruded slot extends in a direction substantially transverse to the direction of the primary inlet passage for communicating fluid pressure to said first as-extruded slot.

8. The improvement according to claim 7 in which said second as-extruded slot is defined by a pair of arcuate ears extending integrally from a side face of the socket and approaching each other at their distal ends to define a continuous gap therebetween.

9. The improvement according to claim 8 in which said metal formation comprises extruded brass.

10. The improvement according to claim 8 in which said metal formation comprises extruded aluminum.

* * * * *